United States Patent [19]

Davey et al.

[11] Patent Number: 4,976,519
[45] Date of Patent: Dec. 11, 1990

[54] PROPELLABLE OPTICAL FIBER CABLE

[75] Inventors: Rodney J. Davey, Rainhill; Alan A. Sadler, Frodsham, both of England

[73] Assignees: BICC plc, London; Corning Limited, Sunderland, both of England

[21] Appl. No.: 209,871

[22] Filed: Jun. 22, 1988

[30] Foreign Application Priority Data

Jun. 23, 1987 [GB] United Kingdom ............. 8714640

[51] Int. Cl.$^5$ ................................................ G02B 6/44
[52] U.S. Cl. ............................................. 350/96.23
[58] Field of Search .................................. 350/96.23

[56] References Cited

U.S. PATENT DOCUMENTS

| 4,143,942 | 3/1979 | Anderson | 350/96.23 |
| 4,641,916 | 2/1987 | Oestreich et al. | 350/96.23 |
| 4,740,053 | 4/1988 | Cassidy | 350/96.23 |
| 4,770,489 | 9/1988 | Saito et al. | 350/96.23 |

FOREIGN PATENT DOCUMENTS

| 108590 | 5/1984 | European Pat. Off. . |
| 157610 | 10/1985 | European Pat. Off. . |
| 2641166 | 3/1977 | Fed. Rep. of Germany . |
| 3219455 | 11/1983 | Fed. Rep. of Germany . |
| 2096353 | 10/1982 | United Kingdom . |
| 2122367 | 1/1984 | United Kingdom . |
| 2156873 | 10/1985 | United Kingdom . |

OTHER PUBLICATIONS

Proceedings of the 27th International Wire and Cable Symposium (Nov. 14–16, 1978).
Principles of Fibre-Optical Cable Design (Proceedings of the IEE, vol. 123, No. 6, Jun. 1976).

*Primary Examiner*—Frank Gonzalez
*Attorney, Agent, or Firm*—Darby & Darby

[57] ABSTRACT

An optical fibre cable comprises an inner sheath containing at least one optical fibre member, and an outer sheath containing the inner sheath. The inner sheath is of a material which is soft and has a low modulus of elasticity. The outer sheath of a material having bulk properties, such as density and stiffness, and surface properties, such as surface texture and friction such that the cable can be propelled along a duct by a flow of air travelling along the duct. An intermediate sheath may be provided between the inner and outer sheaths.

8 Claims, 1 Drawing Sheet

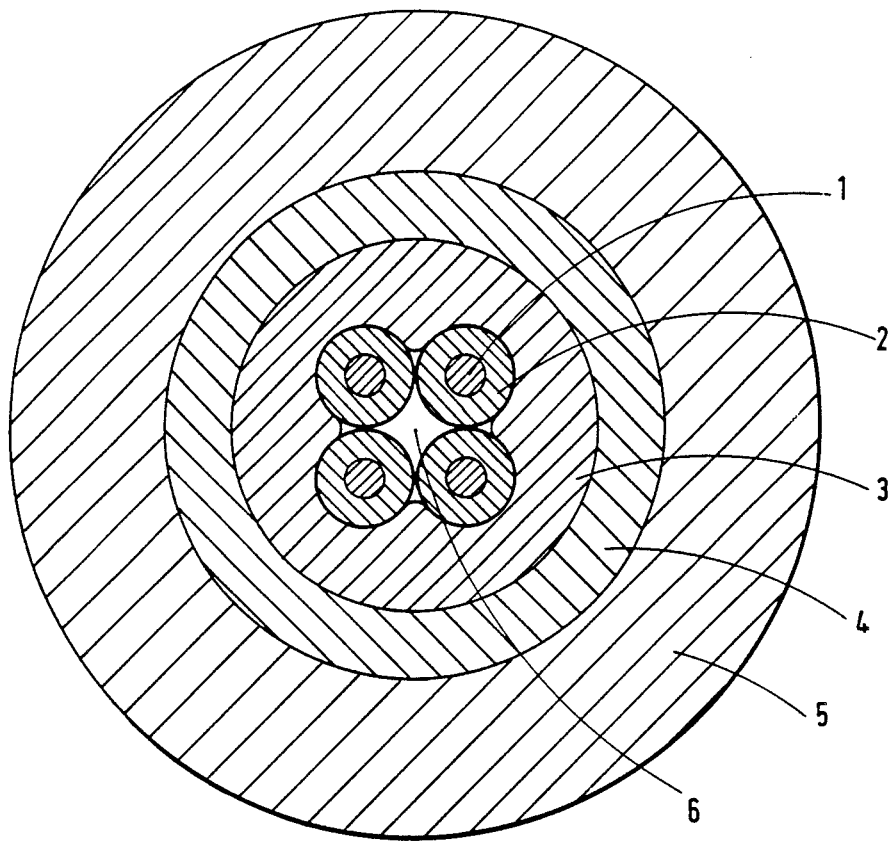

PROPELLABLE OPTICAL FIBER CABLE

This invention relates to optical fibre cables.

EP-A-108590 describes a method of installing an optical fibre cable in which the cable is propelled along a previously installed duct by fluid drag of a gaseous medium, preferably air, blown along the duct in the desired direction of cable advance. EP-A-108590 describes a number of designs of cables for installation using the method of the invention (hereinafter referred to as the "blown fibre method"), but preferred cable designs for use in the blown fibre method are described in EP-A-157610. The designs of EP-A-157610 use an inner sheath containing one or more optical fibre, and an outer sheath containing the inner sheath. The outer sheath is of a material having a low density, for example a foam, an it is this which reduces the overall density of the cable to a value sufficiently low for it to be blown satisfactorily.

An object of the present invention is to provide an improved design of optical fibre cable which can be installed using the blown fibre method.

According to the present invention there is provided an optical fibre cable comprising an inner sheath containing at least one optical fibre, and an outer sheath containing the inner sheath, the inner sheath being of a material which is soft and has a low modulus of elasticity, and the outer sheath having bulk and surface properties such that the cable can be propelled along a duct by air blown along the duct.

An intermediate layer may be provided between the inner and outer sheaths, with the intermediate layer being chosen to provide, for example, additional mechanical strength and/or environmental protection for the fibres.

An embodiment of the present invention is shown in cross-section in the accompanying drawing, which is not to scale.

The drawing shows a cable comprising a plurality of optical fibres 1 made, for example, of silica. In the illustrated embodiment four such fibres are shown, but there could be more or less as desired. Each fibre is surrounded by a protective coating 2, for example of a UV-cured acrylate resin. Typically each fibre 1 has a diameter of 125 microns and the thickness of the coating 2 is such as to bring the overall diameter of the fibre 1 plus coating 2 up to about 250 microns. A fibre 1 plus its coating 2 is referred to as a fibre member in the following description.

The fibre members are surrounded by an inner sheath 3 of a material which is soft and has a low modulus of elasticity. The sheath 3 may, for example, be formed of acrylate or thermoplastic rubber. An intermediate layer 4 surrounds the sheath 3. The layer 4 is preferably of a material which is hard and has a high modulus of elasticity, so as to confer mechanical protection on the soft sheath 3 and the fibre members which the sheath contains. If desired, the intermediate layer 4 could be chosen to be of a material having a low permeability of moisture vapour and good resistance to chemical attack, so as to provide environmental protection for the sheath 3 and the fibre members.

The intermediate layer 4 is surrounded by an outer sheath 5 of a material, for example, a foam, having a low density, e.g. 0.6. Examples of materials which could be used for this purpose are foamed polyethylene and foamed acrylate, the latter having the advantage of a lower coefficient of thermal expansion. The bulk and surface properties of the sheath 5 are such that it can be blown satisfactorily in the blown fibre method. By "bulk properties" we refer primarily to density and stiffness, and by "surface properties" we refer primarily to surface texture and friction. Typically the sheath 5 may have a low density. Typically, the outer diameter of the sheath 3 is 0.8 mm, that of the layer 4 is 1.0 mm and that of the sheath 5 is 1.7 mm. These dimensions are appropriate for a four-fibre cable, but would of course vary for cables having more or less than four fibres.

Reverting to the inner sheath 3 it will be seen that this contacts substantially the whole exterior surface of the fibre members, except for the interior space 6 defined between the fibre members. If, as would be convenient, the sheath 3 were applied to the fibre members by an extrusion process it would be difficult to fill the space 6 with the sheath material. It is conceivable, however, that some other method might be used for application of the sheath 3, in which case the space 6 might also be filled with sheath material, for example to resist longitudinal penetration of liquid and gaseous media and to support substantially all of the surface area of the fibre members, thus improving stability.

Since the inner sheath 3 is formed of a material which has a low modulus of elasticity it serves to distribute any stresses arising within the cable in a reasonably uniform fashion, particularly where the space 6 is also filled. This contrasts with the preferred design disclosed in EP-A-157610 where there is an inner sheath formed of a material of high modulus of elasticity which holds the fibre members tightly together along lines of contact. Although the material of the sheath 3 has a low modulus of elasticity, allowing elastic deformation of the structure, it is nevertheless adequate to retain its structural integrity through manufacturing and installation operations. The uniform distribution of stresses and large area of contact of the soft inner layer reduces stress at the interface with the fibres, thus reducing the risk of microbending, either during processing or in service. This is of particular value where the cable is liable to be subject to wide variations in temperatures, since such temperature variations give rise to forces which are liable to cause increased attenuation in the optical fibres. Desirably, the material of the sheath 3 has a coefficient of thermal expansion as close as possible to that of silica, so as to reduce stress on the fibre from changes in temperature. However, the low modulus of elasticity of the material renders it less important than it would otherwise be to select a material for the sheath 3 having a particular coefficient of thermal expansion.

The material and application process for sheath 3 are preferably such as to avoid strong adhesion to the fibres. This, combined with its softness allows it to be removed easily from around the fibre members when preparing the cable for connection to external connectors or when the individual fibre members have to be routed separately from one another.

Various modifications are possible to the embodiment shown in the drawing. As already mentioned, the intermediate layer 4 may be omitted, and this layer may not be required if the sheaths 3 and 5 by themselves provide adequate protection for the fibre members. In another modification, an all-plastic fibre may be used in place of an acrylate-coated silica fibre.

The following table sets out, by way of example, some properties for the materials of which the cable may be made.

TABLE

|  | Hardness (Shore scale) | Modulus of elasticity (Young's modulus) | Thermal coefficient of expansion |
|---|---|---|---|
| Fiber 1 | — | $7.3 \times 10^4$ N/mm$^2$ | $4 \times 10^{-7}$/°C. |
| Acrylate 2 | — | — | $6 \times 10^{-5}$/°C. |
| Sheath 3 | 40A–60A | <100 N/mm$^2$ | <$3 \times 10^{-4}$/°C. |
| Layer 4 | >75 D | >900 N/mm$^2$ | <$1.1 \times 10^{-4}$/°C. |
| Sheath 5 | — | c.100 N/mm$^2$ | $2 \times 10^{-4}$/°C.* |
| Sheath 5 | — | c.100 N/mm$^2$ | $5 \times 10^{-5}$/°C.** |

*Sheath of foamed polyethylene
**Sheath of foamed acrylate

In the foregoing reference has been made to a cable as being blowable. It is believed that it will be understood by those skilled in the art whether a given cable is or is not to be regarded as blowable. However, one test which can be employed is as follows. A 50 m length of duct having a circular internal cross-section 4.0 mm in diameter is wound in a single layer around the outside of a cylindrical drum 0.75 m in diameter. A 50 m length of cable to be tested is then inserted completely into the duct by any suitable method, which may, but need not, be a blowing method.

An air flow of 20 standard liters/minute is then established down the duct. The time taken for the cable to emerge completely from the downstream end of the duct is recorded. If this fails to occur, or does so in a time greater than a pre-set time, the cable is regarded as not being blowable. The pre-set time may be as long as 1 hour, but is preferably not more than 10 minutes, more preferably not more than 5 minutes, and still more preferably not more than 1 minute. A cable which is highly blowable may emerge in as little as 20 seconds. For the purposes of the test the static coefficient of friction between the cable and the duct is taken to be 0.15. If in fact the coefficient of friction is different an appropriate modification is made to the times quoted above.

The above test is designed for a cable as shown in FIG. 1. Appropriate modifications would be made for cables of other designs.

We claim:

1. An optical fibre cable comprising an inner sheath containing at least one optical fibre member, and an outer sheath containing the inner sheath, the inner sheath comprising a material which has a shore hardness of not more than about 60A and has a modulus of elasticity of less than about 100 N/MM$^2$, and the outer sheath comprising a material such that the cable will traverse a 50 m length of duct having an internal diameter of 4.0 mm wound in a spiral around a cylindrical drum having a diameter of 0.75 m in not more than one hour when an air flow of 20 standard liters/minute is established down the duct.

2. A cable according to claim 1, comprising an intermediate sheath between the inner and outer sheaths.

3. A cable according to claim 2, wherein the intermediate sheath comprises a material which is hard compared to the material of the inner sheath and has a high modulus of elasticity compared to the material of the inner sheath.

4. A cable according to claim 1, wherein the inner sheath contacts said at least one fibre member over at least a substantial portion of its exterior surface.

5. A cable according to claim 4, wherein there is a plurality of optical fibre members so arranged as to create at least one interstice between them, and the material of the inner sheath at least substantially fills the or each interstice.

6. A cable according to claim 1, wherein said at least one optical fibre member comprises a silica fibre surrounded by a protective coating.

7. A cable according to claim 1, wherein the outer sheath is of a foamed material.

8. A cable according to claim 1, in which said inner sheath has a thermal coefficient of expansion of less than $3 \times 10^{-4}$/°C. and said outer sheath has a modulus of elasticity of about 100 N/MM$^2$ and a thermal coefficient of expansion having a range of $5 \times 10^{-5}$/°C. to $2 \times 10^{-4}$/°C.

* * * * *